United States Patent
Delajon et al.

(10) Patent No.: US 10,392,466 B2
(45) Date of Patent: Aug. 27, 2019

(54) TWO-COMPONENT POLYURETHANE ADHESIVE COMPOSITION

(71) Applicant: 3M INNOVATIVE PROPERTIES COMPANY, St. Paul, MN (US)

(72) Inventors: Christophe Delajon, Bischheim (FR); Mathieu Kiester, Pfaffenhoffen (FR); Eric Schmitt, Strasbourg (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/520,881

(22) PCT Filed: Nov. 12, 2015

(86) PCT No.: PCT/US2015/060254
§ 371 (c)(1),
(2) Date: Apr. 21, 2017

(87) PCT Pub. No.: WO2016/077511
PCT Pub. Date: May 19, 2016

(65) Prior Publication Data
US 2017/0335046 A1    Nov. 23, 2017

(30) Foreign Application Priority Data
Nov. 14, 2014  (EP) ................................ 14193172

(51) Int. Cl.
| C08G 18/16 | (2006.01) |
| C08G 18/20 | (2006.01) |
| C08G 18/36 | (2006.01) |
| C08G 18/40 | (2006.01) |
| C08G 18/42 | (2006.01) |
| C08G 18/48 | (2006.01) |
| C08G 18/76 | (2006.01) |
| C08K 3/26 | (2006.01) |
| C09J 175/04 | (2006.01) |

(52) U.S. Cl.
CPC ....... *C08G 18/2063* (2013.01); *C08G 18/161* (2013.01); *C08G 18/2081* (2013.01); *C08G 18/36* (2013.01); *C08G 18/4018* (2013.01); *C08G 18/42* (2013.01); *C08G 18/48* (2013.01); *C08G 18/7664* (2013.01); *C09J 175/04* (2013.01); *C08K 2003/265* (2013.01)

(58) Field of Classification Search
CPC ............ C08G 18/2063; C08G 18/7664; C08G 18/161; C08G 18/2081; C08G 18/36; C08G 18/4018; C08G 18/42; C08G 18/48; C08J 175/04; C08K 2003/265
See application file for complete search history.

(56) References Cited

U.S. PATENT DOCUMENTS

| 8,790,781 B2 | 7/2014 | Demmig | |
| 2009/0035506 A1* | 2/2009 | Pind .................... | C08G 18/3215 428/73 |
| 2012/0298657 A1* | 11/2012 | Wessels ............... | B65D 88/121 220/1.5 |
| 2012/0301729 A1 | 11/2012 | Schmider | |

FOREIGN PATENT DOCUMENTS

| EP | 1072622 | 1/2001 |
| EP | 1589087 | 10/2005 |
| EP | 1997616 | 12/2008 |
| EP | 2597107 | 5/2013 |
| JP | H02-265915 | 10/1990 |
| JP | 2002-003811 | 1/2002 |
| JP | 2006-282922 | 10/2006 |
| JP | 2011-123736 | 6/2011 |
| JP | 2012-251053 | * 12/2012 |
| WO | WO 1995-08579 | 3/1995 |

OTHER PUBLICATIONS

Machine English translation of JP 2012-251053, Araki et al., Dec. 20, 2012.*
International Search Report for PCT International Application No. PCT/US2015/060254, dated Feb. 4, 2016, 5pgs.

* cited by examiner

*Primary Examiner* — Patrick D Niland
(74) *Attorney, Agent, or Firm* — Steven A. Bern; Philip Y. Dahl

(57) ABSTRACT

The present disclosure relates to a curable two-component polyurethane adhesive composition comprising: a) a first component C1 comprising at least one polyol; b) a second component C2 comprising at least one isocyanate; c) a polyurethane catalytic system comprising a first bicyclic amine and a second bicyclic amine; and d) optionally, a particulate filler material. The present disclosure also relates to a sandwich panel comprising at least a core layer, at least a first structural panel and at least a second structural panel and to a method of manufacturing and using thereof.

14 Claims, No Drawings

TWO-COMPONENT POLYURETHANE ADHESIVE COMPOSITION

TECHNICAL FIELD

The present disclosure relates generally to polyurethane adhesive compositions, more specifically to the field of two-component curable and cured polyurethane adhesive compositions. The adhesive compositions of the present disclosure are particularly suitable for the manufacturing of sandwich panels. The present disclosure also relates to a method of manufacturing a sandwich panel and to methods of using such polyurethane adhesive compositions.

BACKGROUND

Sandwich panels are well known in the industry, especially in the construction and transportation industry. Sandwich panels are laminated structures composed of alternating objects of different materials. Typically, sandwich panels comprise a core structure trapped between external structural sheets. Due to the versatility of materials used in the manufacturing of sandwich panels, efficient bonding solution is required.

In that context, two component epoxy adhesives have been widely used as bonding solution for manufacturing sandwich panels. However, due to its reactivity epoxy adhesives generally require high curing temperature and/or long pressing time, which are undesired in industrial production processes. Alternative bonding solutions using polyurethane adhesives, in particular two-component urethane adhesives have been used and are known to offer the advantage of an extended pot life at ambient temperature at the detriment of the curing time. In order to promote curing, these systems typically require a catalyst, typically an organometallic compound, such as e.g. catalysts based on organotin compounds or organobismuth compounds; or an amine or amine-like compound. Unfortunately however, the faster curing or conversion permitted by these catalysts is generally accompanied with shortening of the pot life.

Industrial processes of manufacturing sandwich panels typically require adhesive compositions providing long open time and minimal press time, while providing acceptable curing time. Polyurethane-based adhesives claimed to provide both long open times and rapid "on demand" curing are described in WO 95/08579 A1 (Schoener et al.) and in U.S. 2012/0301729 A1 (Schmider et al.). The disclosed systems do however require using complex catalytic and/or curing systems, which in turn will lead to cost-inefficient and complex production processes. Some systems also make use of recognized harmful materials such as tin- or bismuth-based compounds, requiring stringent CLP labeling.

Without contesting the technical advantages associated with the adhesive solutions known in the art, there is still a need for a stable and cost-effective adhesive composition providing long open time and low toxicity. Other advantages of the adhesive compositions and methods of the disclosure will be apparent from the following description.

SUMMARY

According to one aspect, the present disclosure relates to a curable two-component polyurethane adhesive composition comprising:
  a) a first component C1 comprising at least one polyol;
  b) a second component C2 comprising at least one isocyanate;
  c) a polyurethane catalytic system comprising a first bicyclic amine and a second bicyclic amine; and
  d) optionally, a particulate filler material.

In another aspect, the present disclosure is directed to a method of manufacturing a sandwich panel comprising at least a core layer, at least a first structural panel and at least a second structural panel, wherein the method comprises the step of using a curable composition as described above.

According to still another aspect, the present disclosure relates to a sandwich panel comprising at least a core layer, at least a first structural panel and at least a second structural panel, and which further comprises a cured composition bonding the first structural panel to one side of the core layer and the second structural panel to the other side if the core layer, wherein the cured composition is obtained by mixing the first component C1, the second component C2 and the polyurethane catalytic system of a curable composition as described above, followed by heating the curable composition above the activating temperature of the polyurethane catalytic system.

In still another aspect, the present disclosure is directed to the use of a curable composition as described above for manufacturing a sandwich panel comprising at least a core layer, at least a first structural panel and at least a second structural panel.

DETAILED DESCRIPTION

According to a first aspect, the present disclosure relates to a curable two-component polyurethane adhesive composition comprising:
  a) a first component C1 comprising at least one polyol;
  b) a second component C2 comprising at least one isocyanate;
  c) a polyurethane catalytic system comprising a first bicyclic amine and a second bicyclic amine; and
  d) optionally, a particulate filler material.

In the context of the present disclosure, it has been surprisingly found that a curable two-component polyurethane adhesive composition as described above, in particular a composition comprising a polyurethane catalytic system comprising a first bicyclic amine and a second bicyclic amine, provides excellent characteristics and performance as to open time. The polyurethane adhesive compositions according to the present disclosure may reach an open time exceeding 20 minutes, while maintaining excellent curing time characteristics, in particular when used for manufacturing sandwich panels. The open time is a well known parameter in the field of sandwich panel manufacturing, and is meant to refer to the maximum time after adhesive application during which repositioning is still possible. In the context of the present disclosure, the open time is measured according to the test method described in the experimental section.

In addition, the curable two-component polyurethane adhesive compositions as described herein provide surprisingly good shelf life under storage, as they are typically provided with a shelf life of more than 9 months.

The polyurethane adhesive compositions according to the present disclosure are further characterized by excellent characteristics and performance in terms of press time. Because the polyurethane catalytic system used herein does not comprise any organometallic compounds, such as e.g. organotin compounds or organobismuth compounds, the adhesive compositions of the present disclosure are characterized by low toxicity.

As such, the polyurethane adhesive compositions sensitive adhesives according to the present disclosure are particularly suited for the manufacture of sandwich panels, as they provide a stable, cost-effective, convenient and versatile bonding solution for the manufacture of a broad variety of sandwich panels involving various core layer and structural sheet materials.

The first component C1 for use herein comprises a polyol. Any polyol commonly known in the art may be used in the context of the present disclosure. As such, the polyol for use herein is not particularly limited. Suitable polyols for use herein will be easily identified by those skilled in the art, in the light of the present description. Exemplary polyols for use herein are described in U.S. 2012/0301729 A1 (Schmider et al.), the content of which is herewith fully integrated by reference. Exemplary polyols include, but are not limited to, aliphatic polyols, aromatic polyols, and any combinations thereof. Polyols for use herein may be diols, triols, or tetraols. Suitable aromatic polyols include those comprising a bisphenol-A or bisphenol-F moiety.

According to a particular aspect, the polyol for use herein is selected from the group consisting of polyether polyols, polyester polyols, and any combinations or mixtures thereof. According to an advantageous aspect of the curable polyurethane adhesive composition according, the first component C1 comprises a polyether polyol and a polyester polyol.

In a typical aspect, the total amount of polyol(s) in component C1 is of less than 60 wt %, less than 50 wt %, less than 40 wt %, or even less than 30 wt %, based on the total weight of component C1. According to an exemplary aspect, the total amount of polyols in component C1 is comprised between 10 Wt % and 60 wt %, between 15 wt % and 50 wt %, between 15 wt % and 45 wt %, between 20 wt % and 40 wt %, between 20 wt % and 35 wt %, or even between 20 wt % and 30 wt %, based on the total weight of component C1.

The second component C2 for use herein comprises an isocyanate. Any isocyanate commonly known in the art may be used in the context of the present disclosure. As such, the isocyanate for use herein is not particularly limited. Suitable isocyanates for use herein will be easily identified by those skilled in the art, in the light of the present description. Exemplary isocyanates for use herein are described in U.S. 2012/0301729 A1 (Schmider et al.), the content of which is herewith fully integrated by reference. Exemplary isocyanates include, but are not limited to, aliphatic isocyanates, aromatic isocyanates, and any combinations thereof. Suitable aromatic isocyanates include diphenylmethane diisocyanate, toluene diisocyanate, and any polymers, derivatives or mixtures thereof. Suitable aliphatic isocyanates include methylenedicyclohexane diisocyanate, isophorone diisocyanate, hexamethylene diisocyanate, and any polymers, derivatives or mixtures thereof.

In a particular aspect, the isocyanate for use in the second component C2 may be present at least partially in a polymeric form, or in the form of a combination of isocyanates and polyisocyanates.

The total amount of isocyanate in component C2 is typically selected such that the ratio of the isocyanate groups in component C2 to the groups reactive to isocyanate groups in component C1 is in the range comprised between 0.8 and 1.2, between 0.9 and 1.1, or even about 1.

The curable two-component polyurethane adhesive composition according to the present disclosure further comprises a polyurethane catalytic system comprising a first bicyclic amine and a second bicyclic amine.

The polyurethane catalytic system for use herein may be comprised in component C1 and/or in component C2. In an advantageous aspect of the curable composition according to the present disclosure, the first bicyclic amine and the second bicyclic amine are both comprised in the first component C1 or in the second component C2. In a preferred aspect of the present disclosure, the first bicyclic amine and the second bicyclic amine are both comprised in the first component C1. In an alternative aspect, the first bicyclic amine is comprised in the first component C1 and the second bicyclic amine is comprised in the second component C2.

Any bicyclic amine commonly known in the art may be used in the context of the present disclosure as long as the first bicyclic amine and a second bicyclic amine are structurally different. As such, the bicyclic amines for use herein are not particularly limited. Suitable bicyclic amines for use herein will be easily identified by those skilled in the art, in the light of the present description.

According to an advantageous aspect, at least one of the first bicyclic amine or the second bicyclic amine is a bicyclic tertiary amine. In a preferred aspect, both of the first bicyclic tertiary amine and the second bicyclic tertiary amine are bicyclic tertiary amines.

In a still preferred aspect of the polyurethane catalytic system for use herein, at least one of the first bicyclic amine or the second bicyclic amine is selected from the group consisting of aza bicyclic amines, aza bicyclic tertiary amines, diaza bicyclic amines and diaza bicyclic tertiary amines. More preferably, both of the first bicyclic amine and the second bicyclic amine are selected from the group consisting of aza bicyclic amines, aza bicyclic tertiary amines, diaza bicyclic amines and diaza bicyclic tertiary amines.

Suitable bicyclic amines for use herein are preferably selected from the group consisting of 1-azabicyclo [2.2.2] octane; 8-azabicyclo [3.2.1]octane; N-methyl-8-azabicyclo [3.2.1]octane; 1,4-diazabicyclo [2.2.2] octane; 1,8-diazabicyclo[5.4.0]undec-7-ene; 1,5-diazabicyclo[5.4.0]undec-5-ene; 1,5-diazabicyclo[4.3.0]non-5-ene; 3,8-diazabicyclo [3.2.1]octane; 1,4-diazabicyclo[3.2.2]nonane; 3,9-diazabicyclo [3.3.1]non-1-ene; 7,9-diazabicyclo [4.2.2] decane; 1,4-diazabicyclo-[4.4.0]decane; and any combinations thereof.

According to an advantageous aspect, at least one of the first bicyclic amine or the second bicyclic amine is a diaza bicyclic tertiary amine. Preferably, both of the first bicyclic amine and the second bicyclic amine are diaza bicyclic tertiary amines.

In an advantageous aspect still, the diaza bicyclic tertiary amine for use herein is selected from the group consisting of 1,4-diazabicyclo[2.2.2]octane; 1,8-diazabicyclo[5.4.0]undec-7-ene; 1,5-diazabicyclo[5.4.0]undec-5-ene; 1,5-diazabicyclo[4.3.0]non-5-ene; 1,4-diazabicyclo[3.2.2]nonane; 1,4-diazabicyclo-[4.4.0]decane; and any combinations or mixtures thereof.

According to a particularly preferred aspect, the diaza bicyclic tertiary amine for use herein is selected from the group consisting of 1,4-diazabicyclo [2.2.2]octane; 1,8-diazabicyclo[5.4.0]undecene-7; and any combinations or mixtures thereof.

According to a particularly preferred aspect still, the first bicyclic amine is selected to be 1,8-diazabicyclo[5.4.0] undec-7-ene and the second bicyclic amine is selected to be 1,4-diazabicyclo[2.2.2]octane. In an alternatively preferred aspect, the first bicyclic amine is selected to be 1,4-diazabicyclo[2.2.2]octane and the second bicyclic amine is selected to be 1,8-diazabicyclo[5.4.0] undec-7-ene.

In some aspects of the curable two-component polyurethane adhesive composition according to the present disclosure, the polyurethane catalytic system consists of the first bicyclic amine and the second bicyclic amine as described above.

The polyurethane catalytic system may be present in the polyurethane adhesive composition according to the present disclosure in any suitable amount. In a typical aspect though, the total amount of polyurethane catalytic system is of less than 3.0 wt %, less than 2.5 wt %, less than 2.0 wt %, less than 1.5 wt %, or even less than 1.0 wt %, based on the total weight of the curable composition. According to an exemplary aspect, the total amount of polyurethane catalytic system is comprised between 0.05 wt % and 3 wt %, between 0.15 wt % and 2.0 wt %, between 0.3 wt % and 1.5 wt %, between 0.45 wt % and 1.5 wt %, between 0.7 wt % and 1.5 wt %, or even between 0.85 wt % and 1.5 wt %, based on the total weight of the curable composition.

In a typical aspect of the curable composition, the total amount of polyurethane catalytic system in component C1 or in component C2 is of less than 2.0 wt %, less than 1.5 wt %, or even less than 1.0 wt %, based on the total weight of component C1 or component C2 as applicable. Typically still, the total amount of polyurethane catalytic system in component C1 or in component C2 is above 0.1 wt %, above 0.2 wt %, above 0.4 wt %, above 0.5 wt %, above 0.6 wt %, based on the total weight of component C1 or component C2, as applicable.

According to an advantageous aspect, the total amount of polyurethane catalytic system present in component C1 or in component C2 is comprised between 0.05 wt % and 2 wt %, between 0.1 wt % and 1.5 wt %, between 0.2 wt % and 1.0 wt %, between 0.3 wt % and 1.0 wt %, between 0.5 wt % and 1.0 wt %, or even between 0.6 wt % and 1.0 wt %, based on the total weight of component C1 or component C2, as applicable.

In an advantageous aspect of the curable composition according to the present disclosure, the polyurethane catalytic system is comprised in component C1.

According to an exemplary aspect, the weight ratio of the first bicyclic amine to the second bicyclic amine present in the curable composition ranges from 2.5:1 to 1:2.5, from 2:1 to 1:2, from 1.5:1 to 1:1.5, from 1.2:1 to 1:1.2, from 1.15:1 to 1:1.15, or even from 1.1:1 to 1:1.1.

The curable two-component polyurethane adhesive composition of the present disclosure may comprise any additional ingredients commonly known in the art. Exemplary ingredients include, but are not limited to, inorganic or organic fillers, pigments, dispersing agents, rheology modifiers, silica, plasticizers, fibers, solvents, foaming agents, catalysts which accelerate the reaction of the isocyanate groups, drying agents, coupling agents, adhesion promoters, heat stabilizers, UV stabilizers, light stabilizers, flame retardants, biocides, defoaming agents, wetting agents, surfactants, and any combinations or mixtures thereof.

According to an advantageous aspect, the curable two-component polyurethane adhesive composition of the present disclosure further comprises a filler material, in particular a particulate filler material. Any filler material, in particular particulate filler material commonly known in the art, may be used in the context of the present disclosure.

In a typical aspect, this filler material is comprises in component C1 or in component C2. According to an exemplary aspect, the total amount of particulate filler material in component C1 or in component C2 is above 40 wt %, above 45 wt %, above 50 wt %, above 55 wt %, above 60 wt %, or even above 65 wt %, based on the total weight of component C1 or component C2, as appropriate. Advantageously, the total amount of particulate filler material in component C1 or in component C2 is comprised between 40 wt % and 85 wt %, between 45 wt % and 85 wt %, between 50 wt % and 80 wt %, between 55 wt % and 80 wt %, between 60 wt % and 75 wt %, or even between 65 wt % and 75 wt %, based on the total weight of component C1 or component C2.

According to a particular aspect of the present disclosure, the particulate filler material is fully comprised in component C1.

Advantageously, the particulate filler material for use herein is selected from the group consisting of inorganic or organic particulate filler materials, in particular inorganic particulate filler materials.

In a typical execution, the particulate filler material is selected from the group consisting of ground or precipitate calcium carbonates, optionally coated with e.g. fatty acids or fatty esters; carbon black; fumed silica; silica; kaolin; PVC; aluminum oxide; fibers; and any combinations or mixtures thereof.

Preferably, the particulate filler material is selected from the group consisting calcium carbonates, in particular ground calcium carbonates treated with fatty acids or fatty esters such as e.g. calcium stearate.

According to an advantageous aspect, the particulate filler material has an average particle size of above 3 μm, above 5 μm, above 6 μm, above 8 μm, or even above 10 μm. Preferably, the particulate filler material has an average particle size comprised between 3 μm and 10 μm, between 4 mm and 8 μm, or even between 5 μm and 8 μm. The average particle size is typically measured by gravitational technique according to test method ISO 13317-3:2001.

According to an advantageous aspect of the present disclosure, the curable composition is substantially free of polyurethane metal catalysts, in particular substantially free of poyurethane catalysts based on organotin compounds, organobismuth compounds, organozinc compounds or organozirconium compounds. In the context of the present disclosure, the term "substantially free" is meant to designate a quantity of the relevant compound which is typically less than 1 wt %, less than 0.5 wt %, or even less than 0.1 wt %.

In still another advantageous aspect, the curable composition according to the present disclosure is a non-foamable, or a non-foamed composition.

The curable two-component polyurethane adhesive composition of the present disclosure may be prepared according to processes which are known to those skilled in the art. Advantageously, the various ingredients of the curable composition are anhydrous or at least dried before being used for preparing the curable composition. The preparation is typically performed under protective environment, using an inert gas such as nitrogen. Preferably, components C1 and C2 are prepared and stored in separate containers sealed against humidity.

The two-component polyurethane adhesive composition of the present disclosure cures upon mixing of components C1 and C2. The amount of component C2 to be mixed with component C1 is selected preferably such that the ratio of the isocyanate groups in component C2 to the groups reactive to isocyanate groups in component C1 is in the range comprised between 0.8 and 1.2, between 0.9 and 1.1, or even about 1. The mixing operation may be performed by static or dynamic mixers.

The weight mixing ratio of the first component C1 to the second component C2 is typically ranges from 1:1 to 10:1, from 1.5:1 to 8:1, from 1.5:1 to 6:1, or even from 2:1 to 5:1.

According to an advantageous aspect, the curable composition according to the present disclosure has an open time of above 5 minutes, above 10 minutes, above 15 minutes, or even above 20 minutes, when measured at 20° C. and a relative humidity of 65% according to the test method described in the experimental section.

The relatively long open time provided by the curable two-component polyurethane adhesive composition of the present disclosure makes it particularly suitable for the manufacture of sandwich panels. Long open time allows higher error tolerance and increased flexibility in sandwich panels production operations. This is particularly advantageous when producing sandwich panels involving relatively large parts.

According to another advantageous aspect, the curable composition according to the present disclosure has a press time of less than 20 minutes, less than 15 minutes, less than 12 minutes, less than 10 minutes, or even less than 8 minutes, when measured at 40° C. according to the test method described in the experimental section. The press time is a well known parameter in the field of sandwich panel manufacturing, and is meant to refer to the time needed for the curable adhesive composition to polymerize during the heat-pressing operation. In the context of the present disclosure, the press time is measured according to the test method described in the experimental section. A minimal press time is highly favorable in sandwich panels' production operations as this allows faster and more cost-effective production.

According to still another advantageous aspect, the curable composition according to the present disclosure has a shelf life of more than 3 months, more than 6 months, or even more than 9 months, when determined after storage at 20° C. and a relative humidity of 50% according to the test method described in the experimental section.

In another aspect, the present disclosure is directed to a method of manufacturing a sandwich panel comprising at least a core layer, at least a first structural panel and at least a second structural panel, wherein the method comprises the step of using a curable two-component polyurethane adhesive composition as described above.

According to a particular aspect, the method of manufacturing a sandwich panel comprises the steps of:
  a) mixing the first component C1, the second component C2, and the polyurethane catalytic system, thereby forming a curable composition, wherein the polyurethane catalytic system is activated at temperatures above a threshold temperature;
  b) applying the curable composition obtained in step a) on the first structural panel;
  c) contacting the core layer with the curable composition applied on the first structural panel;
  d) applying the curable composition obtained in step a) on the second structural panel;
  e) contacting the core layer with the curable composition applied on the second structural panel, thereby forming a multilayer assembly; and
  f) heating the multilayer assembly obtained in step e) at a temperature above the threshold temperature.

According to a preferred aspect of the method, the step of mixing the first component C1, the second component C2, and the polyurethane catalytic system, is performed immediately prior to the step of applying the curable composition obtained in step a) on the first structural panel.

In an exemplary aspect, the step of heating the multilayer assembly is performed, preferably by heat-pressing, at a temperature comprised between 30° C. and 100° C., between 30° C. and 80° C., between 30° C. and 70° C., between 35° C. and 60° C., between 35° C. and 55° C., or even between 35° C. and 50° C.

The method according to the present disclosure is suitable for manufacturing any sandwich panels commonly known in the art. Exemplary sandwich structures for use herein may be easily identified by those skilled in the art in the light of the present disclosure.

Suitable sandwich structures for use herein include, but are not limited to, those comprising a core layer selected from the group consisting of fibrous cores (such as e.g. inorganic or mineral wools), open and closed-cell-structured foams (such as e.g. polyvinylchloride, polyurethane, polyolefin, polystyrene, polyester or metal foams), expanded or extruded foams (such as e.g. polymer—polyurethane, epoxy, metal—aluminum foams), syntactic foams, solid cores (such as e.g. wood—balsa; polymer—epoxy cores), honeycomb structures (such as e.g. metal-aluminum, steel; Nomex—aramid fibre dipped in resin (epoxy, phenolic or polyamide) honeycomb structures), and any combinations thereof.

Exemplary (first and second) structural panels use herein include, but are not limited to, those comprising a material selected from the group consisting of FRP (fibre reinforced polymer—thermoplastic and thermoset), polymers, wood, aramid sheet, metals (such as e.g. aluminum, titanium, steel), ceramic, laminates of glass or carbon fiber-reinforced thermoplastics or thermoset polymers (such as e.g. unsaturated polyesters or epoxies), and any combinations thereof.

According to an advantageous aspect of the method of manufacturing a sandwich panel, the core layer is made from a material selected from the group consisting of mineral wool, in particular rock wool and glass wool; polyolefins; polyesters; polystyrenes; metals; wood; rubbers; nonwovens; and any combinations or mixtures thereof.

Advantageously, the core layer is a foam layer, in particular a polyethylene foam layer, a polyester foam layer or a polyurethane foam layer. Alternatively, the core layer comprises a honeycomb structure.

According to another advantageous aspect of the method of manufacturing a sandwich panel, the first structural panel and/or the second structural panel are made from a material selected from the group consisting of metals, in particular aluminum, aluminum alloys, stainless steel; wood; polyolefins; and any combinations or mixtures thereof.

According to another aspect, the present disclosure relates to a method of curing a curable composition, which comprises the steps of:
  a) providing a two-component (heat-)curable composition comprising a first component C1 comprising at least one polyol, a second component C2 comprising at least one isocyanate; and optionally, a particulate filler material;
  b) providing a (heat-activated) polyurethane catalytic system comprising a first bicyclic amine and a second bicyclic amine, wherein the polyurethane catalytic system is activated at temperatures above a threshold temperature; and
  c) heating the curable composition at a temperature above the threshold temperature so as to effect its curing by activating the polyurethane catalytic system.

According to still another aspect, the present disclosure is directed to a sandwich panel comprising at least a core layer, at least a first structural panel and at least a second structural panel, and which further comprises a cured composition bonding the first structural panel to one side of the core layer and the second structural panel to the other side of the core layer, wherein the cured composition is obtained by mixing the first component C1, the second component C2 and the polyurethane catalytic system of a curable composition as described above, followed by heating the curable composition above the activating temperature of the polyurethane catalytic system.

According to an advantageous aspect of the sandwich panel, the core layer is made from a material selected from the group consisting of mineral wool, in particular rock wool and glass wool; polyolefins; polyesters; polystyrenes; metals; wood; rubbers; nonwovens; and any combinations thereof.

Advantageously, the core layer is a foam layer, in particular a polyethylene foam layer, a polyester foam layer or a polyurethane foam layer. Alternatively, the core layer comprises a honeycomb structure.

According to another advantageous aspect of the sandwich panel, the first structural panel and/or the second structural panel are made from a material selected from the group consisting of metals, in particular aluminum, aluminum alloys, stainless steel; wood; polyolefins; and any combinations or mixtures thereof.

In still another aspect of the present disclosure, it is provided a polyurethane catalytic system comprising a first bicyclic amine and a second bicyclic amine as described above. In a particular aspect, polyurethane catalytic system consists of a first bicyclic amine and a second bicyclic amine as described above.

The present disclosure is further directed to the use of a curable two-component polyurethane adhesive composition as described above for manufacturing a sandwich panel comprising at least a core layer, at least a first structural panel and at least a second structural panel.

In another aspect, the present disclosure is directed to the use of a combination of a first bicyclic amine and a second bicyclic amine as described above for preparing a curable polyurethane composition, in particular a curable two-component polyurethane adhesive composition.

In still another aspect, the present disclosure is directed to the use of a combination of a first bicyclic amine and a second bicyclic amine as described above, as a polyurethane catalytic system, in particular as a urethane-promoting catalytic system, more in particular as accelerators of the reaction of the isocyanate groups.

In yet another aspect, the present disclosure is directed to the use of a sandwich panel as described above for industrial applications, in particular for transportation market applications, in particular automotive and aerospace applications, or for construction market applications.

Item 1 is a (heat-)curable two-component polyurethane adhesive composition comprising:
 a) a first component C1 comprising at least one polyol;
 b) a second component C2 comprising at least one isocyanate;
 c) a (heat-activated) polyurethane catalytic system comprising a first bicyclic amine and a second bicyclic amine; and
 d) optionally, a particulate filler material.

Item 2 is the curable composition of item 1, wherein at least one of the first bicyclic amine or the second bicyclic amine is a bicyclic tertiary amine, preferably wherein both of the first bicyclic tertiary amine and the second bicyclic tertiary amine are bicyclic tertiary amines.

Item 3 is a curable composition according to any of item 1 or 2, wherein at least one of the first bicyclic amine or the second bicyclic amine is selected from the group consisting of aza bicyclic amines, aza bicyclic tertiary amines, diaza bicyclic amines and diaza bicyclic tertiary amines; preferably wherein both of the first bicyclic amine and the second bicyclic amine are selected from the group consisting of aza bicyclic amines, aza bicyclic tertiary amines, diaza bicyclic amines and diaza bicyclic tertiary amines.

Item 4 is a curable composition according to any of the preceding items, wherein the first bicyclic amine and the second bicyclic amine are selected from the group consisting of 1-azabicyclo[2.2.2]octane; 8-azabicyclo [3.2.1] octane; N-methyl-8-azabicyclo [3.2.1] octane; 1,4-diazabicyclo [2.2.2] octane; 1,8 -diazabicyclo[5.4.0]undec-7-ene; 1,5-diazabicyclo[5.4.0]undec-5-ene; 1,5-diazabicyclo[4.3.0]non-5-ene; 3,8-diazabicyclo[3.2.1] octane; 1,4-diazabicyclo[3.2.2]nonane; 3,9-diazabicyclo[3.3.1]non- 1-ene; 7,9-diazabicyclo[4.2.2]decane; 1,4-diazabicyclo-[4.4.0]decane; and any combinations thereof.

Item 5 is a curable composition according to any of the preceding items, wherein at least one of the first bicyclic amine or the second bicyclic amine is a diaza bicyclic tertiary amine, preferably wherein both of the first bicyclic amine and the second bicyclic amine are diaza bicyclic tertiary amines.

Item 6 is a curable composition according to item 5, wherein the diaza bicyclic tertiary amine is selected from the group consisting of 1,4-diazabicyclo[2.2.2]octane; 1,8-diazabicyclo[5.4.0]undec-7-ene; 1,5-diazabicyclo[5.4.0]undec-5-ene; 1,5-diazabicyclo[4.3.0]non-5-ene; 1,4-diazabicyclo[3.2.2]nonane; 1,4-diazabicyclo-[4.4.0]decane; and any combinations thereof.

Item 7 is a curable composition according to any of item 5 or 6, wherein the diaza bicyclic tertiary amine is selected from the group consisting of 1,4-diazabicyclo[2.2.2]octane; 1,8-diazabicyclo[5.4.0] undec-7-ene; and any combinations thereof.

Item 8 is a curable composition according to any of the preceding items, wherein the polyurethane catalytic system is comprised in component C1 and/or in component C2.

Item 9 is a curable composition according to any of the preceding items, wherein the first bicyclic amine and the second bicyclic amine are both comprised in the first component C1 or in the second component C2.

Item 10 is a curable composition according to any of the preceding items, wherein the first bicyclic amine is comprised in the first component C1 and the second bicyclic amine is comprised in the second component C2.

Item 11 is a curable composition according to of the preceding items, wherein the first bicyclic amine is selected to be 1,8-diazabicyclo[5.4.0] undec-7-ene and the second bicyclic amine is selected to be 1,4-diazabicyclo[2.2.2] octane.

Item 12 is a curable composition according to any of items 1 to 11, wherein the first bicyclic amine is selected to be 1,4-diazabicyclo[2.2.2]octane and the second bicyclic amine is selected to be 1,8-diazabicyclo[5.4.0] undec-7-ene.

Item 13 is a curable composition according to any of the preceding items, wherein the (heat-activated) polyurethane catalytic system consists of the first bicyclic amine and the second bicyclic amine.

Item 14 is a curable composition according to any of the preceding items, wherein the first component C1 comprises a polyol selected from the group consisting of polyether polyols, polyester polyols, and any combinations or mixtures thereof.

Item 15 is a curable composition according to item 14, wherein the first component C1 comprises a polyether polyol and a polyester polyol.

Item 16 is a curable composition according to any of the preceding items, wherein the total amount of polyols in component C1 is of less than 60 wt %, less than 50 wt %, less than 40 wt %, or even less than 30 wt %, based on the total weight of component C1.

Item 17 is a curable composition according to any of the preceding items, wherein the total amount of polyols in component C1 is comprised between 10 wt % and 60 wt %, between 15 wt % and 50 wt %, between 15 wt % and 45 wt %, between 20 wt % and 40 wt %, between 20 wt % and 35 wt %, or even between 20 wt % and 30 wt %, based on the total weight of component C1.

Item 18 is a curable composition according to any of the preceding items, wherein the total amount of polyurethane catalytic system is of less than 3.0 wt %, less than 2.5 wt %, less than 2.0 wt %, less than 1.5 wt %, or even less than 1.0 wt %, based on the total weight of the curable composition.

Item 19 is a curable composition according to any of the preceding items, wherein the total amount of polyurethane catalytic system is comprised between 0.05 wt % and 3 wt %, between 0.15 wt % and 2.0 wt %, between 0.3 wt % and 1.5 wt %, between 0.45 wt % and 1.5 wt %, between 0.7 wt % and 1.5 wt %, or even between 0.85 wt % and 1.5 wt %, based on the total weight of the curable composition.

Item 20 is a curable composition according to any of the preceding items, wherein the total amount of polyurethane catalytic system in component C1 or in component C2 is of less than 2.0 wt %, less than 1.5 wt %, or even less than 1.0 wt %, based on the total weight of component C1 or component C2.

Item 21 is a curable composition according to any of the preceding items, wherein the total amount of polyurethane catalytic system in component C1 or in component C2 is above 0.1 wt %, above 0.2 wt %, above 0.4 wt , above 0.5 wt %, above 0.6 wt %, based on the total weight of component C1 or component C2.

Item 22 is a curable composition according to any of the preceding items, wherein the total amount of polyurethane catalytic system in component C1 or in component C2 is comprised between 0.05 wt % and 2 wt %, between 0.1 wt % and 1.5 wt %, between 0.2 wt % and 1.0 wt %, between 0.3 wt % and 1.0 wt %, between 0.5 wt % and 1.0 wt %, or even between 0.6 wt % and 1.0 wt %, based on the total weight of component C1 or component C2.

Item 23 is a curable composition according to any of item 21 or 22, wherein the polyurethane catalytic system is comprised in component C1.

Item 24 is a curable composition according to any of the preceding items, wherein the weight ratio of the first bicyclic amine to the second bicyclic amine ranges from 2.5:1 to 1:2.5, from 2:1 to 1:2, from 1.5:1 to 1:1.5, from 1.2:1 to 1:1.2, from 1.15:1 to 1:1.15, or even from 1.1:1 to 1:1.1.

Item 25 is a curable composition according to any of the preceding items, wherein the total amount of particulate filler material in component C1 or in component C2 is above 40 wt %, above 45 wt %, above 50 wt %, above 55 wt %, above 60 wt %, or even above 65 wt %, based on the total weight of component C1 or component C2.

Item 26 is a curable composition according to any of the preceding items, wherein the total amount of particulate filler material in component C1 or in component C2 is comprised between 40 wt % and 85 wt %, between 45 wt % and 85 wt %, between 50 wt % and 80 wt %, between 55 wt % and 80 wt %, between 60 wt % and 75 wt %, or even between 65 wt % and 75 wt %, based on the total weight of component C1 or component C2.

Item 27 is a curable composition according to any of item 25 or 26, wherein the particulate filler material is comprised in component C1.

Item 28 a curable composition according to any of the preceding items, wherein the particulate filler material is selected from the group consisting of inorganic or organic particulate filler materials, in particular inorganic particulate filler materials.

Item 29 is a curable composition according to any of the preceding items, wherein the particulate filler material is selected from the group consisting ground or precipitate calcium carbonates, optionally coated with e.g. fatty acids or fatty esters; carbon black; fumed silica; silica; kaolin; PVC; aluminum oxide; fibers; and any combinations or mixtures thereof.

Item 30 is a curable composition according to any of the preceding items, wherein the particulate filler material is selected from the group consisting calcium carbonates, in particular calcium stearate treated ground calcium carbonates.

Item 31 is a curable composition according to any of the preceding items, wherein the particulate filler material has an average particle size of above 3 μm, above 5 μm, above 6 μm, above 8 μm, or even above 10 μm.

Item 32 is a curable composition according to any of the preceding items, wherein the particulate filler material has an average particle size comprised between 3 mm and 10 μm, between 4 μm and 8 μm, or even between 5 μm and 8 μm.

Item 33 is a curable composition according to any of the preceding items, which is substantially free of polyurethane metal catalysts, in particular substantially free of poyurethane catalysts based on organotin compounds or organobismuth compounds.

Item 34 is a curable composition according to any of the preceding items, which is non-foamable.

Item 35 is a curable composition according to any of the preceding items, which has an open time of above 5 minutes, above 10 minutes, above 15 minutes, or even above 20 minutes, when measured at 20° C. and a relative humidity of 65% according to the test method described in the experimental section.

Item 36 is a curable composition according to any of the preceding items, which has a press time of less than 20 minutes, less than 15 minutes, less than 12 minutes, less than 10 minutes, or even less than 8 minutes, when measured at 40° C. according to the test method described in the experimental section.

Item 37 is a curable composition according to any of the preceding items, which has a shelf life of more than 3 months, more than 6 months, or even more than 9 months, when determined after storage at 20° C. and a relative humidity of 50% according to the test method described in the experimental section.

Item 38 is a method of manufacturing a sandwich panel comprising at least a core layer, at least a first structural panel and at least a second structural panel, wherein the method comprises the step of using a curable composition according to any of the preceding items.

Item 39 is a method according to item 38, which comprises the steps of:
 a) mixing the first component C1, the second component C2, and the polyurethane catalytic system, thereby forming a curable composition, wherein the polyurethane catalytic system is activated at temperatures above a threshold temperature;
b) applying the curable composition obtained in step a) on the first structural panel;
c) contacting the core layer with the curable composition applied on the first structural panel;
d) applying the curable composition obtained in step a) on the second structural panel;
e) contacting the core layer with the curable composition applied on the second structural panel, thereby forming a multilayer assembly; and
f) heating the multilayer assembly obtained in step e) at a temperature above the threshold temperature.

Item 40 is a method according to item 39, wherein the step of mixing the first component C1, the second component C2, and the polyurethane catalytic system, is performed immediately prior to the step of applying the curable composition obtained in step a) on the first structural panel.

Item 41 is a method according to any of items 38 to 40, wherein the step of heating the multilayer assembly is performed, preferably by heat-pressing, at a temperature comprised between 30° C. and 100° C., between 30° C. and 80° C., between 30° C. and 70° C., between 35° C. and 60° C., between 35° C. and 55° C., or even between 35° C. and 50° C.

Item 42 is a method according to any of items 38 to 41, wherein the core layer is made from a material selected from the group consisting of mineral wool, in particular rock wool and glass wool; polyolefins; polyesters; polystyrenes; metals; wood; rubbers; nonwovens; and any combinations thereof.

Item 43 is a method according to any of items 38 to 42, wherein the core layer is a foam layer, in particular a polyethylene foam layer, a polyester foam layer or a polyurethane foam layer.

Item 44 is a method according to any of items 38 to 42, wherein the core layer comprises a honeycomb structure.

Item 45 is a method according to any of items 38 to 43, wherein the first structural panel and/or the second structural panel are made from a material selected from the group consisting of metals, in particular aluminum, aluminum alloys, stainless steel; wood; polyolefins; and any combinations thereof.

Item 46 is a method of curing a curable composition, which comprises the steps of:
a) providing a two-component (heat-)curable composition comprising a first component C1 comprising at least one polyol, a second component C2 comprising at least one isocyanate; and optionally, a particulate filler material;
b) providing a (heat-activated) polyurethane catalytic system comprising a first bicyclic amine and a second bicyclic amine, wherein the polyurethane catalytic system is activated at temperatures above a threshold temperature; and
c) heating the curable composition at a temperature above the threshold temperature so as to effect its curing by activating the polyurethane catalytic system.

Item 47 is a sandwich panel comprising at least a core layer, at least a first structural panel and at least a second structural panel, and which further comprises a cured composition bonding the first structural panel to one side of the core layer and the second structural panel to the other side if the core layer, wherein the cured composition is obtained by mixing the first component C1, the second component C2 and the polyurethane catalytic system of a curable composition as described in any of items 1 to 37, followed by heating the curable composition above the activating temperature of the polyurethane catalytic system.

Item 48 is a sandwich panel according to item 47, wherein the core layer is made from a material selected from the group consisting of mineral wool, in particular rock wool and glass wool; polyolefins; polyesters; polystyrenes; metals; wood; rubbers; nonwovens; and any combinations thereof.

Item 49 is a sandwich panel according to any of item 47 or 48, wherein the core layer is a foam layer, in particular a polyethylene foam layer, a polyester foam layer or a polyurethane foam layer.

Item 50 is a sandwich panel according to any of items 47 to 49, wherein the core layer comprises a honeycomb structure.

Item 51 is a sandwich panel according to any of items 47 to 50, wherein the first structural panel and/or the second structural panel are made from a material selected from the group consisting of metals, in particular aluminum, aluminum alloys, stainless steel; wood; polyolefins; and any combinations thereof.

Item 52 is a polyurethane catalytic system comprising (or consisting of) a first bicyclic amine and a second bicyclic amine as described in any of items 1 to 37.

Item 53 is the use of a curable composition according to any of items 1 to 37 for manufacturing a sandwich panel comprising at least a core layer, at least a first structural panel and at least a second structural panel.

Item 54 is the use of a combination of a first bicyclic amine and a second bicyclic amine as described in any of items 1 to 37 for preparing a curable polyurethane composition, in particular a curable two-component polyurethane adhesive composition.

Item 55 is the use of a combination of a first bicyclic amine and a second bicyclic amine as described in any of items 1 to 37, as a polyurethane catalytic system, in particular as a urethane-promoting catalytic system, more in particular as accelerators of the reaction of the isocyanate groups.

Item 56 is the use of a sandwich panel according to any of items 47 to 51 for industrial applications, in particular for transportation market applications, in particular automotive and aerospace applications, or for construction market applications.

EXAMPLES

The present disclosure is further illustrated by the following examples. These examples are merely for illustrative purposes only and are not meant to be limiting on the scope of the appended claims.

Test Methods and Procedures:
Open Time

In a climatic room (20° C. and 65% relative humidity), the curable two-component polyurethane adhesive composition sample is applied in multiple stripes with a regular syringe on a 100 mm×100 mm stainless steel sheet having a thickness of 0.6 mm and comprising a surface treatment providing a surface energy above 36 dynes per centimeter.

The stripes have a length of about 100 mm, a width of about 3 mm and are separated each other by a 10 mm gap. Directly after application, a stopwatch is started. A piece of Styrofoam™ (expanded polystyrene foam) available from The Dow Chemical Company and having the following dimension: 30 mm×50 mm×25 mm, is placed on the substrate containing the stripes along the stripes longitudinal direction. A piece of expanded polystyrene foam is pressed against the substrate using gentle finger pressure every 30 seconds and the correct wetting of the Styrofoam™ piece is checked. Correct wetting of the expanded polystyrene foam piece by the adhesive sample is ensured when after pressing the polystyrene foam piece onto the sample stripes and immediate removal, transfer of the composition to the surface of the polystyrene foam piece does occur without stringing (no cording). The time at which the correct wetting of the polystyrene foam piece by the composition to the surface is not ensured anymore, is recorded. The composition sample is tested 3 times and the results are expressed in seconds and represent the average from the three measurements.

Press Time

In a climatic room (20° C. and 65% relative humidity), the curable two-component polyurethane adhesive composition sample is applied on a 100 mm×100 mm stainless steel sheet having a thickness of 0.6 mm and comprising a surface treatment providing a surface energy above 36 dynes/per centimeter. The sample composition is applied in nine stripes using a regular syringe and along the entire length of the substrate. The stripes have a length of about 100 mm, a width of about 3 mm and are separated each other by a gap of about 10 mm. A core layer of extruded polystyrene (XPS) available from The Dow Chemical Company under the tradename Styrofoam™ and having the following dimension: 10 cm×10 cm and 10 cm thickness, is placed onto the stainless steel sheet containing the stripes and pressed using manual pressure. A second similar surface treated stainless steel sheet (dimension 10 cm×10 cm and 1cm thickness) is prepared using the exact same procedure as described above and using the same exact amount of curable two-component polyurethane adhesive composition. The second surface treated stainless steel sheet so prepared is placed flush onto the exposed surface of the core layer of extruded polystyrene (XPS) and pressed using manual pressure thereby obtaining a test sandwich panel. The test sandwich panel is then placed and pressed in an automatic press (Fontijne LabEcon series 300, commercially available from Fontijne Grotnes) at 40° C. and using a pressure of 10 kN. At the same time, a stopwatch is started. The pressed sample is removed from the automatic press checked every 30 seconds and the failure mode is checked. The press time is considered sufficient and the failure mode correct when superficial tearing is observed within the core layer (as opposed to adhesive failure at the interface between the core layer and the flat board substrate) after opening the pressed test sandwich panel by pulling one of the external flat board substrates using manual force. The time at which the correct failure is observed is recorded. The sample composition is tested 3 times and the results are expressed in seconds and represent the average from the three measurements.

Shelf Life

Shelf life of the curable compositions according to the present disclosure is determined upon storage at ambient conditions (20° C. and 50% relative humidity) according to the following criteria: visual aspect, reactivity and viscosity after mixing are checked, and should remain unchanged.

Materials Employed:

VORANOL RN 490: Polyether polyol, commercially available from The Dow Chemical Company, USA.
CASTOR OIL FSG: Polyester polyol, commercially available from Loiret Haetjens, France.
HOLCOFLEX black 216D: Pigment, commercially available from Holcoflex, The Netherlands.
ANTI-TERRA U: Dispersing agent, commercially available from Byk Additives, Germany.
BYK 9076: Dispersing agent, commercially available from Byk Additives, Germany.
BENTONE 38: Rheology modifier, commercially available from Elementis plc, UK.
CALCIT MX20: calcium carbonate filler, commercially available from SH minerals GmbH, Germany.
OMYA BLH: calcium carbonate filler, commercially available from Omya, France.
EXXSOL D80: hydrocarbon solvent, commercially available from Exxonmobil, France.
CATALYST A-33: polyurethane catalyst based on 1,4-diazabicyclo[2.2.2]octane, commercially available from Momentive, USA.
TIB KAT 318: tin-based polyurethane catalyst, commercially available from TIB Chemicals, Germany.
TIB KAT 716: bismuth-based polyurethane catalyst, commercially available from TIB Chemicals, Germany.
ALCHEM DBU: polyurethane catalyst based on 1,8-diazabicyclo[5.4.0]undec-7-ene, commercially available from Air Products, France.
DABCO 8154: polyurethane catalyst based on 1,4-diazabicyclo[2.2.2]octane, commercially available from Air Products, France.
VORAMER MN 2115: polymeric MDI, commercially available from The Dow Company, USA.

Preparation of the Two Part Polyurethane Adhesive Compositions:

The two part polyurethane adhesive compositions of example 1 and of comparative examples C-1 to C-3 are prepared according to the general procedure as outlined for example 1:

Preparation of the First Component C1 (Polyol):

Component C1 is prepared by mixing both polyols, pigment, dispersing agents in a mixer (Dispermat VE10M with additional Teflon blade and dispersing plate) at 800 rpm during 15 min. The filler material is then added and mixed at 1000 rpm during at least 2 hours. When the temperature is below 45° C., the solvent and the catalytic system is finally added, and the mixing is maintained during 30 min.

Second Component C2 (MDI isocyanate):

Polymeric MDI is used as purchased from The Dow Company under tradename VORAMER MN 2115.

Mixing of Component C1 and Component C2:

Mixing of parts C 1 and C2 is realized by manual mixing. Component C 1 and component C2 are mixed according to a weight mixing ratio of the first component C1 to the second component C2 of 100/25 (or 4:1).

EXAMPLES

Example 1 and Comparative Examples C-1 to C-3

In example 1, a curable two-component polyurethane adhesive composition is prepared by mixing components C1 and C2, wherein component C1 comprises a polyurethane catalytic system according to the present disclosure, i.e. comprising a first bicyclic amine (DBU) and a second bicyclic amine (DABCO). Comparative example C-1 is prepared by mixing components C1 and C2, wherein component C1 comprises a polyurethane catalytic system not according to the present disclosure, i.e. comprising only one bicyclic amine (DABCO). Comparative example C-2 is prepared by mixing components C1 and C2, wherein component C1 comprises a polyurethane catalytic system not according to the present disclosure, i.e. comprising one bicyclic amine (DABCO) and a tin-based polyurethane catalyst. Comparative example C-3 is prepared by mixing components C1 and C2, wherein component C1 comprises a polyurethane catalytic system not according to the present disclosure, i.e. comprising one bicyclic amine (DABCO) and a bismuth-based polyurethane catalyst. The ingredients and their amounts in the C1 and C2 components are indicated in Tables 1 and 2. Curable compositions are prepared by manually mixing the respective C1 and C2 components in a disposable cup. Extrusion, curing and examination of the samples are done according to the general procedures given above. Test results are shown in Table 3.

TABLE 1

Composition of Component C1.

| Ingredients (% by weight) | C1-1 | C1-2 | C1-3 | C1-4 |
|---|---|---|---|---|
| VORANOL RN 490 | 8.53 | 8.55 | 14.56 | 12.67 |
| CASTOR OIL FSG | 17.46 | 17.50 | 27.97 | 27.07 |
| HOLCOFLEX 216D | — | — | 0.50 | 0.12 |
| ANTI-TERRA U | 0.56 | 0.56 | 1.12 | 1.02 |
| BYK 9076 | 1.95 | 1.96 | 0.20 | |
| BENTONE 38 | — | — | 0.66 | 0.61 |
| CALCIT MX 20 | — | — | 52.50 | 50.37 |
| OMYA BLH D32 | 68.53 | 68.69 | | |
| EXXSOL D80 | 2.18 | 2.19 | 1.50 | 7.63 |
| CATALYST A-33 | | | 0.20 | 0.10 |
| TIB KAT 318 | | | 0.13 | |
| TIB KAT 716 | | | | 0.47 |
| ALCHEM DBU | 0.49 | 0.55 | | |
| DABCO 8154 | 0.29 | | | |
| WATER | | | | 0.65 |
| Total | 100 | 100 | 100 | 100 |

TABLE 2

Composition of Component C2.

| Ingredients (in % by weight) | B |
|---|---|
| VORAMER MN 2115 | 100 |
| TOTAL | 100 |

TABLE 3

Properties of the cured polyurethane adhesive compositions.

| Test | Ex 1 (C1-1/C2) | C-1 (C1-2/C2) | C-2 (C1-3/C2) | C-3 (C1-4/C2) |
|---|---|---|---|---|
| Open time (seconds at 20° C. and 65% relative humidity)* | 1200 | 570 | 180 | 570 |
| Press time (seconds at 40° C.)* | 240 | 225 | 240 | 465 |
| Shelf life (months) | >9 | >9 | 6 | 3 |

Note:
*Measured as described in the Test Method section.

The invention claimed is:

1. A curable two-component polyurethane adhesive composition comprising:
 a first component C1 comprising at least one polyol;
 a second component C2 comprising at least one isocyanate; and
 a polyurethane catalytic system comprising a first bicyclic amine and a second bicyclic amine, wherein the first bicyclic amine is selected to be 1,8-diazabicyclo[5.4.0]undec-7-ene and the second bicyclic amine is selected to be 1,4-diazabicyclo[2.2.2]octane.

2. A curable composition according to claim 1, wherein the total amount of polyurethane catalytic system is of less than 3.0 wt, based on the total weight of the curable composition.

3. A curable composition according to claim 1, wherein the polyurethane catalytic system is comprised in component C1.

4. A curable composition according to claim 1, additionally comprising a particulate filler material, wherein the total amount of particulate filler material in component C1 or in component C2 is above 40 wt %, based on the total weight of component C1 or component C2.

5. A curable composition according to claim 1, additionally comprising a particulate filler material selected from the group consisting of inorganic or organic particulate filler materials.

6. A curable composition according to claim 1, which has an open time of above 5 minutes, when measured at 20° C. and a relative humidity of 65% according to the test method described in the experimental section.

7. A curable composition according to claim 1, which has a press time of less than 20 minutes, when measured at 40° C. according to the test method described in the experimental section.

8. A curable composition according to claim 1, which has a shelf life of more than 3 months, when determined after storage at 20° C. and a relative humidity of 50% according to the test method described in the experimental section.

9. A method of manufacturing a sandwich panel comprising at least a core layer, at least a first structural panel and at least a second structural panel, wherein the method comprises the step of bonding the core layer to at least one of the first and second structural panels with a curable composition according to claim 1.

10. A method according to claim 9, which comprises the steps of:
 mixing the first component C1, the second component C2, and the polyurethane catalytic system, thereby forming a curable composition, wherein the polyurethane catalytic system is activated at temperatures above a threshold temperature;
 applying the curable composition obtained in step a) on the first structural panel;
 contacting the core layer with the curable composition applied on the first structural panel;
 applying the curable composition obtained in step a) on the second structural panel;
 contacting the core layer with the curable composition applied on the second structural panel, thereby forming a multilayer assembly; and
 heating the multilayer assembly obtained in step e) at a temperature above the threshold temperature.

11. A sandwich panel comprising at least a core layer, at least a first structural panel and at least a second structural panel, and which further comprises a cured composition bonding the first structural panel to one side of the core layer and the second structural panel to the other side if the core layer, wherein the cured composition is obtained by mixing the first component C1, the second component C2 and the polyurethane catalytic system of a curable composition as described in claim 1, followed by heating the curable composition above the activating temperature of the polyurethane catalytic system.

12. The method according to claim 9 wherein the core layer is a polyethylene foam layer, a polyester foam layer or a polyurethane foam layer.

13. The sandwich panel according to claim 11 wherein the core layer is a polyethylene foam layer, a polyester foam layer or a polyurethane foam layer.

14. A curable composition according to claim 1, wherein the curable two-component polyurethane adhesive composition is free of polyurethane metal catalysts.

* * * * *

UNITED STATES PATENT AND TRADEMARK OFFICE
CERTIFICATE OF CORRECTION

Page 1 of 1

PATENT NO. : 10,392,466 B2
APPLICATION NO. : 15/520881
DATED : August 27, 2019
INVENTOR(S) : Delajon et al.

It is certified that error appears in the above-identified patent and that said Letters Patent is hereby corrected as shown below:

In the Specification

Column 6
Line 32 (approx.), delete "4 mm" and insert -- 4 µm --, therefor.

Column 11
Line 38, delete "wt ," and insert -- wt %, --, therefor.

Column 12
Line 30, delete "3 mm" and insert -- 3 µm --, therefor.

Column 15
Line 30, delete "1cm" and insert -- 1 cm --, therefor.

Column 16
Line 44, delete "C 1" and insert -- C1 --, therefor.
Line 45, delete "C 1" and insert -- C1 --, therefor.

In the Claims

Column 18
Line 41, in Claim 10, before "mixing" insert -- a) --.
Line 46, in Claim 10, before "applying" insert -- b) --.
Line 48, in Claim 10, before "contacting" insert -- c) --.
Line 50, in Claim 10, before "applying" insert -- d) --.
Line 52, in Claim 10, before "contacting" insert -- e) --.
Line 55, in Claim 10, before "heating" insert -- f) --.

Signed and Sealed this
Sixteenth Day of June, 2020

Andrei Iancu
*Director of the United States Patent and Trademark Office*